US011951720B2

(12) United States Patent
Taguwa et al.

(10) Patent No.: US 11,951,720 B2
(45) Date of Patent: Apr. 9, 2024

(54) THERMOPLASTIC RESIN LAMINATE

(71) Applicant: MITSUBISHI GAS CHEMICAL COMPANY, INC., Tokyo (JP)

(72) Inventors: Ken Taguwa, Kanagawa (JP); Nobuyuki Koike, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 195 days.

(21) Appl. No.: 17/286,970

(22) PCT Filed: Oct. 21, 2019

(86) PCT No.: PCT/JP2019/041271
§ 371 (c)(1),
(2) Date: Apr. 20, 2021

(87) PCT Pub. No.: WO2020/085286
PCT Pub. Date: Apr. 30, 2020

(65) Prior Publication Data
US 2021/0387445 A1    Dec. 16, 2021

(30) Foreign Application Priority Data

Oct. 26, 2018  (JP) ................................. 2018-202085

(51) Int. Cl.
| | | |
|---|---|---|
| *B32B 27/30* | (2006.01) | |
| *B32B 7/00* | (2019.01) | |
| *B32B 7/027* | (2019.01) | |
| *B32B 27/08* | (2006.01) | |
| *B32B 27/36* | (2006.01) | |
| *C08L 25/14* | (2006.01) | |
| *C08L 33/06* | (2006.01) | |
| *C08L 33/10* | (2006.01) | |
| *C08L 33/12* | (2006.01) | |
| *C08L 67/00* | (2006.01) | |

(52) U.S. Cl.
CPC ............ *B32B 27/308* (2013.01); *B32B 27/36* (2013.01); *B32B 7/00* (2013.01); *B32B 7/027* (2019.01); *B32B 27/08* (2013.01); *B32B 27/30* (2013.01); *B32B 27/302* (2013.01); *B32B 2250/02* (2013.01); *B32B 2250/24* (2013.01); *B32B 2274/00* (2013.01); *B32B 2307/30* (2013.01); *B32B 2307/308* (2013.01); *B32B 2307/702* (2013.01); *B32B 2307/732* (2013.01); *B32B 2333/12* (2013.01); *B32B 2367/00* (2013.01); *B32B 2451/00* (2013.01); *B32B 2457/20* (2013.01); *C08L 25/14* (2013.01); *C08L 33/06* (2013.01); *C08L 33/10* (2013.01); *C08L 33/12* (2013.01); *C08L 67/00* (2013.01); *Y10T 428/31786* (2015.04); *Y10T 428/31797* (2015.04)

(58) Field of Classification Search
None
See application file for complete search history.

(56) References Cited

U.S. PATENT DOCUMENTS

| | | | |
|---|---|---|---|
| 2003/0211347 A1* | 11/2003 | Rabinovitch | ........... B32B 27/08 428/483 |
| 2007/0010650 A1* | 1/2007 | Crawford | ................ C08L 69/00 528/302 |
| 2007/0232778 A1* | 10/2007 | Moody | ................... C08L 67/02 528/272 |
| 2008/0057236 A1 | 3/2008 | Yamada et al. | |
| 2009/0191403 A1* | 7/2009 | Tripathi | ................ B32B 27/365 428/480 |
| 2014/0268337 A1* | 9/2014 | Lu | ........................... B32B 37/16 359/530 |
| 2015/0080543 A1* | 3/2015 | Aoki | ........................ C08F 8/04 526/329.2 |
| 2015/0239219 A1* | 8/2015 | Matsumura | ........... B32B 27/365 428/339 |
| 2018/0065349 A1* | 3/2018 | Washio | ................... B32B 27/30 |
| 2019/0339420 A1* | 11/2019 | Taguwa | ................. G02B 5/305 |
| 2020/0290324 A1* | 9/2020 | Calvin | ................. B32B 27/365 |
| 2021/0122146 A1* | 4/2021 | Yambe | .................... B32B 27/36 |

FOREIGN PATENT DOCUMENTS

| | | |
|---|---|---|
| CN | 108602335 A | 9/2018 |
| EP | 2583825 A1 | 4/2013 |
| EP | 2 602 108 A1 | 12/2013 |
| JP | 64-69625 A | 3/1989 |
| JP | 11-58653 A | 3/1999 |
| JP | 2006-159902 | 6/2006 |
| JP | 2008-238618 A | 10/2008 |

(Continued)

OTHER PUBLICATIONS

Bhagia, S. et al. "Terephthalic Acid Copolyesters Containing Tetramethylcyclobutanediol for High-Performance Plastics" ChemistryOpen, vol. 10, pp. 830-841. (2021). (Year: 2021).*
"Wikipedia—Polyethylene Terephthalate" (https://en.wikipedia.org/wiki/Polyethylene_terephthalate) (webpage retrieved Feb. 25, 2023). (Year: 2023).*
Extended European Search Report issued in corresponding European Patent Application No. 19876528.1, dated Oct. 25, 2021.
International Search Report issued in International Patent Application No. PCT/JP2019/041271, dated Dec. 10, 2019, along with English translation thereof.
Written Opinion of the International Searching Authority issued in International Patent Application No. PCT/JP2019/041271, dated Dec. 10, 2019, along with English translation thereof.

(Continued)

*Primary Examiner* — Vivian Chen
(74) *Attorney, Agent, or Firm* — GREENBLUM & BERNSTEIN, P.L.C.

(57) ABSTRACT

Provided is a thermoplastic resin laminate suitable for optical applications of transparent substrate materials and protective materials. The thermoplastic resin laminate includes a first layer including an amorphous polyester resin (A) as the main component, and a second layer including a (meth)acrylic resin (B) as the main component on the first layer.

12 Claims, No Drawings

(56) References Cited

FOREIGN PATENT DOCUMENTS

| | | | | |
|---|---|---|---|---|
| JP | 2009-196153 | A | * | 9/2009 |
| JP | 2013-220590 | A | * | 10/2013 |
| JP | 2014-180807 | A | * | 9/2014 |
| JP | 2014-213580 | A | * | 11/2014 |
| JP | 2015-104883 | A | | 6/2015 |
| JP | 2017-164969 | A | * | 9/2017 |
| JP | 2018-59012 | A | | 4/2018 |
| TW | 2014-12868 | A | * | 4/2014 |
| WO | 2015/108064 | A1 | | 7/2015 |

OTHER PUBLICATIONS

Office Action issued in Chinese Patent Application No. 201980069170.6 dated Jul. 26, 21022, along with English translation thereof.

* cited by examiner

THERMOPLASTIC RESIN LAMINATE

TECHNICAL FIELD

The present invention relates to a thermoplastic resin laminate to be used for optical applications of transparent substrate materials and protective materials.

BACKGROUND ART

For cases of automobile interiors, small portable devices, etc., a decorative molded body in which a decorative film having a design layer and a resin formed body are integrated is used. Specifically, a method in which a decorative film is preliminarily formed by means of thermoforming (vacuum forming, pressure forming, vacuum pressure forming, thermal bending forming or the like); then it is set in a mold; and a molten resin is injected into it to form an injection molded body and at the same time, it is integrated with the preliminarily formed decorative film (insert molding method), etc. are widely used. When integrating the resin formed body and the decorative film from the design layer side of the decorative film, for example, a formed body having three-dimensional feeling and depth can be obtained; the design layer in the decorative molded body is not deteriorated by abrasion due to long-term use; and functions including surface hardness and fingerprint-resistant property can be easily imparted.

Examples of transparent materials to be printed constituting decorative films include a polycarbonate resin and an acrylic resin. The polycarbonate resin is excellent in impact resistance and heat resistance but has a problem that surfaces of formed bodies are easily scratched because of its low surface hardness. Meanwhile, the acrylic resin has high surface hardness and excellent scratch resistance but has a problem that breakage such as cracking and chipping tends to easily occur at the time of handling or transporting films.

As methods for achieving a balance between impact resistance and heat resistance as features of the polycarbonate resin and scratch resistance as a feature of the acrylic resin, a laminated film of the polycarbonate resin and the acrylic resin (Patent Document 1) and a laminated film of the polycarbonate resin and a vinyl copolymer resin (Patent Document 2) are proposed. In Patent Document 1, by using a film in which the surface of a formed body is made of the acrylic resin and a print surface is made of the polycarbonate resin, a balance between scratch resistance of the acrylic resin and impact resistance and heat resistance of the polycarbonate resin can be achieved. However, the above-described multilayer films have problems that the range of forming condition is very narrow because forming defects such as whitening, a crack, foaming, a wrinkle, etc. tend to be easily caused at the time of thermoforming, and that, in addition, the films cannot be applied to thermal shaping with high design property such as deep drawing and a sharp edge shape. Further, in the case of use for front plates of information display devices, etc., it may be required to perform thermal shaping while maintaining surface smoothness. For example, in the case of the laminated film of the polycarbonate resin and the acrylic resin, it is required to perform thermal shaping at a temperature much lower than the glass transition temperature of the polycarbonate resin, and as a result, it has problems that it is more difficult to obtain a satisfactory thermally-shaped product, that residual strain at the time of forming tends to increase, and that form change tends to be easily caused by environmental change. Regarding Patent Document 2, for the same reason as that for Patent Document 1, there are problems that it is difficult to obtain a satisfactory thermally-shaped product, that residual strain at the time of forming tends to increase, and that form change tends to be easily caused by environmental change.

As methods for achieving a balance between impact resistance and heat resistance as features of the polycarbonate resin and scratch resistance as a feature of the acrylic resin and improving thermal shapability, a method of using a polycarbonate resin composition, in which the deflection temperature under load (ISO75, a load of 1.8 MPa) is lowered, for a laminated sheet of the polycarbonate resin and the acrylic resin (Patent Document 3) and a technique of lowering the glass transition temperature of a polycarbonate resin layer by subjecting another resin (aromatic polyester) to polymer alloying with the polycarbonate resin layer (Patent Document 4) are proposed. However, when using the above-described methods, it is difficult to perform thermal shaping with high design property such as deep drawing and a sharp edge shape. Further, since these methods require copolymerization and preliminary kneading, the production cost tends to be high, resulting in low economic efficiency. Moreover, since the acrylic resin particularly has a high water absorption rate, poor outer appearance such as foaming may be caused unless it is sufficiently dried before thermoforming.

PRIOR ART DOCUMENTS

Patent Documents

Patent Document 1: Japanese Laid-Open Patent Publication No. S64-69625
Patent Document 2: Japanese Laid-Open Patent Publication No. 2013-220590
Patent Document 3: Japanese Laid-Open Patent Publication No. 2008-238618
Patent Document 4: Japanese Laid-Open Patent Publication No. 2009-196153

SUMMARY OF THE INVENTION

Under the above-described circumstances, it is still desired to develop a novel thermoplastic resin laminate to be used for optical applications of transparent substrate materials and protective materials.

The present invention is, for example, as described below.
[1] A thermoplastic resin laminate, which comprises a first layer mainly composed of an amorphous polyester resin (A) and a second layer mainly composed of a (meth)acrylic resin (B), the second layer being placed on the first layer.
[2] The thermoplastic resin laminate according to item [1], wherein the (meth)acrylic resin (B) comprises a (meth)acrylic acid ester structural unit (a) represented by general formula (1) below:

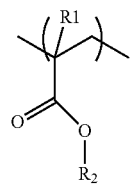

(1)

(wherein R1 represents a hydrogen atom or a methyl group, and R2 represents a $C_1$-$C_{16}$ hydrocarbon group), an aliphatic vinyl structural unit (b) represented by general formula (2) below:

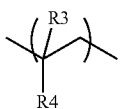
(2)

(wherein R3 represents a hydrogen atom or a methyl group, and R4 is selected from among a cyclohexyl group, a cyclohexadiene group and a cyclohexene group, which are optionally substituted with a $C_1$-$C_4$ hydrocarbon group), and optionally, an aromatic vinyl structural unit (b') represented by formula (3) below:

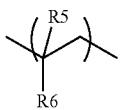
(3)

(wherein R5 represents a hydrogen atom or a methyl group, and R6 represents a phenyl group which is optionally substituted with a $C_1$-$C_4$ hydrocarbon group), and wherein the ratio of the sum of the (meth)acrylic acid ester structural unit (a), the aliphatic vinyl structural unit (b) and the aromatic vinyl structural unit (b') is 90 to 100 mol % relative to the sum of all the structural units in the (meth)acrylic resin (B), and wherein the ratio of the (meth)acrylic acid ester structural unit (a) is 55 mol % to 85 mol % relative to the sum of the (meth)acrylic acid ester structural unit (a), the aliphatic vinyl structural unit (b) and the aromatic vinyl structural unit (b').

[3] The thermoplastic resin laminate according to item [1] or [2], wherein the content of a polycarbonate resin in the first layer is less than 20% by weight.

[4] The thermoplastic resin laminate according to any one of items [1] to [3], wherein the amorphous polyester resin (A) contains units derived from an alicyclic diol and/or heterocyclic diol at a ratio of 50 to 100 mol % relative to all diol units constituting the amorphous polyester resin (A).

[5] The thermoplastic resin laminate according to item [4], wherein the alicyclic diol and/or heterocyclic diol comprises at least one selected from the group consisting of 2,2,4,4-tetramethyl-1,3-cyclobutanediol, 1,4-cyclohexanedimethanol, 1,4:3,6-dianhydro-D-sorbitol and 3,9-bis(1,1-dimethyl-2-hydroxyethyl)-2,4,8,10-tetraoxaspiro[5.5]undecane.

[6] The thermoplastic resin laminate according to item [4] or [5], wherein the alicyclic diol and/or heterocyclic diol comprises at least one selected from the group consisting of 2,2,4,4-tetramethyl-1,3-cyclobutanediol and 1,4:3,6-dianhydro-D-sorbitol.

[6a] The thermoplastic resin laminate according to any one of items [1] to [6], wherein the amorphous polyester resin (A) contains units derived from an alicyclic diol and/or heterocyclic diol at a ratio of 90 to 100 mol % relative to all diol units constituting the amorphous polyester resin (A).

[7] The thermoplastic resin laminate according to any one of items [1] to [6], wherein the amorphous polyester resin (A) contains units derived from 2,2,4,4-tetramethyl-1,3-cyclobutanediol at a ratio of 20 to 40 mol % and units derived from 1,4-cyclohexanedimethanol at a ratio of 60 to 80 mol % relative to all diol units constituting the amorphous polyester resin (A) and contains units derived from an alicyclic diol at a ratio of 90 to 100 mol % relative to all the diol units constituting the amorphous polyester resin (A).

[7a] The thermoplastic resin laminate according to item [7], wherein the amorphous polyester resin (A) contains units derived from 2,2,4,4-tetramethyl-1,3-cyclobutanediol at a ratio of 25 to 40 mol % and units derived from 1,4-cyclohexanedimethanol at a ratio of 60 to 75 mol % relative to all the diol units constituting the amorphous polyester resin (A) and contains units derived from the alicyclic diol at a ratio of 90 to 100 mol % relative to all the diol units constituting the amorphous polyester resin (A).

[8] The thermoplastic resin laminate according to any one of items [1] to [7], wherein the first layer substantially does not contain a polycarbonate resin.

[8a] The thermoplastic resin laminate according to any one of items [1] to [8], wherein the first layer substantially does not contain a polyacrylate resin.

[9] The thermoplastic resin laminate according to any one of items [1] to [8], wherein the amorphous polyester resin (A) contains aromatic dicarboxylic acid units at a ratio of 90 to 100 mol % relative to all dicarboxylic acid units constituting the amorphous polyester resin (A).

[9a] The thermoplastic resin laminate according to any one of items [1] to [9], wherein the amorphous polyester resin (A) contains, as a dicarboxylic acid structural unit, a structural unit derived from terephthalic acid (PTA) and contains, as a diol structural unit, a structural unit derived from: a combination of 2,2,4,4-tetramethyl-1,3-cyclobutanediol (CBDO) and 1,4-cyclohexanedimethanol (CHDM); a combination of 1,4:3,6-dianhydro-D-sorbitol (ISB), ethylene glycol (EG) and 1,4-cyclohexanedimethanol (CHDM); a combination of 3,9-bis(1,1-dimethyl-2-hydroxyethyl)-2,4,8,10-tetraoxaspiro[5.5]undecane (spiroglycol) (SPG), ethylene glycol (EG) and 1,4-cyclohexanedimethanol (CHDM); or a combination of ethylene glycol (EG) and 1,4-cyclohexanedimethanol (CHDM).

[10] The thermoplastic resin laminate according to any one of items [1] to [9], wherein the amorphous polyester resin (A) has a weight average molecular weight of 10,000 to 80,000 and the (meth)acrylic resin (B) has a weight average molecular weight of 100,000 to 150,000.

[11] The thermoplastic resin laminate according to any one of items [1] to [10], wherein the amorphous polyester resin (A) has a glass transition temperature of 110 to 135° C. and the (meth)acrylic resin (B) has a glass transition temperature of 110 to 135° C.

[12] The thermoplastic resin laminate according to any one of items [1] to [11], wherein the absolute value of the difference between the glass transition temperature of the amorphous polyester resin (A) and the glass transition temperature of the (meth)acrylic resin (B) is 10° C. or less.

[13] The thermoplastic resin laminate according to any one of items [1] to [12], which has a thickness of 0.15 to 2.0 mm.

[13a] The thermoplastic resin laminate according to any one of items [1] to [12], wherein the first layer has a thickness of 100 to 1900 μm (preferably 150 to 1500 μm, and more preferably 200 to 1000 μm) and the second layer has a thickness of 10 to 500 μm (preferably 30 to 300 μm, and more preferably 50 to 100 μm).

[13b] The thermoplastic resin laminate according to any one of items [1] to [12], wherein the thickness of the first layer is 75% or more (more preferably 80% or more) of the thickness of the whole thermoplastic resin laminate.

[14] A decorative film comprising the thermoplastic resin laminate according to any one of items [1] to [13].
[15] A display front plate comprising the thermoplastic resin laminate according to any one of items [1] to [13].
[16] A thermoformed body obtained by thermoforming the thermoplastic resin laminate according to any one of items [1] to [13].
[16a] A formed body obtained by insert-molding the thermoplastic resin laminate according to any one of items [1] to [13].
[17] A method for producing a formed body or forming method, which includes thermoforming or insert-molding the thermoplastic resin laminate according to any one of items [1] to [13] under an environment at 90 to 200° C.
[17a] A method for producing a formed body or forming method, which includes thermally bending the thermoplastic resin laminate according to any one of items [1] to [13] under an environment at 90 to 200° C.

The thermoplastic resin laminate of the present invention can be suitably used for optical applications of transparent substrate materials and protective materials.

According to a preferred embodiment of the present invention, at least one of thermoformability (pressure formability, thermal bending formability) and insert moldability, mechanical properties (e.g., impact resistance and surface hardness) and shape stability under high-temperature conditions and under high-temperature and high-humidity conditions is excellent.

According to a preferred embodiment of the present invention, the thermoplastic resin laminate has excellent thermoformability (pressure formability, thermal bending formability) and insert moldability and also has excellent mechanical properties (e.g., impact resistance and surface hardness).

According to a particularly preferred embodiment of the present invention, the thermoplastic resin laminate has excellent thermoformability (pressure formability, thermal bending formability) and insert moldability, and also has excellent mechanical properties (e.g., impact resistance and surface hardness) and shape stability under high-temperature conditions and under high-temperature and high-humidity conditions.

BEST MODE FOR CARRYING OUT THE INVENTION

Hereinafter, the present invention will be described in detail, but the present invention is not limited to production examples, working examples, etc. and can be arbitrarily changed and then practiced within a range not departing from the gist of the present invention.

One embodiment of the present invention is a thermoplastic resin laminate (hereinafter also referred to as "the laminate"), which comprises a first layer mainly composed of an amorphous polyester resin (A) and a second layer mainly composed of a (meth)acrylic resin (B), wherein the second layer is placed on the first layer. The thermoplastic resin laminate of this embodiment is excellent in thermoformability (pressure formability, thermal bending formability) and insert moldability, wherein forming defects such as whitening, a crack, foaming, a wrinkle, etc. at the time of thermoforming are suppressed, and therefore it can be applied to forming under various forming conditions such as deep drawing and a sharp edge shape.

Hereinafter, the constitution of the thermoplastic resin laminate of embodiments will be described in order.

1. First Layer

The first layer contains the amorphous polyester resin (A) as the main component. The amorphous polyester resin (A) contained in the first layer may consist of one material or two or more materials. In this regard, the "amorphous polyester resin" refers to a polyester resin that does not have a crystal portion, i.e., does not have a melting point. The expression "mainly composed of the amorphous polyester resin (A)" means, for example, that the content of the amorphous polyester resin (A) in the first layer is 80% by weight or more relative to the total weight of the first layer. The content of the amorphous polyester resin (A) in the first layer is preferably more than 80% by weight, more preferably 85% by weight or more, even more preferably 90% by weight or more, still more preferably 95% by weight or more, and particularly preferably 98% by weight or more. In one embodiment, the content of the amorphous polyester resin (A) in the first layer is 100% by weight. In one embodiment, the whole of the total weight (100% by weight) of resin component in the first layer is the amorphous polyester resin (A).

By increasing the content of the amorphous polyester resin (A), thermoformability (pressure formability, thermal bending formability) and insert moldability of the thermoplastic resin laminate of the present invention can be improved while maintaining impact resistance comparable to those of polycarbonate resins. In general, a polyester resin is crystallized under high-temperature conditions (e.g., at the time of thermoforming, particularly at the time of insert molding; at the time of use under high-temperature and high-humidity conditions; etc.), and transparency may be deteriorated due to whitening. In the present invention, by using the amorphous polyester resin, crystallization is suppressed even under high-temperature conditions, and a laminate excellent in transparency can be obtained.

In one embodiment, the amorphous polyester resin (A) comprises a polycondensate (hereinafter also referred to as "polycondensate (A)") consisting of a dicarboxylic acid-derived structural unit (dicarboxylic acid structural unit) and a diol-derived structural unit (diol structural unit) described below. It is preferably a polycondensate consisting of at least three structural units selected from among dicarboxylic acid structural units and diol structural units described below.

The dicarboxylic acid structural unit is not particularly limited, and examples thereof include dicarboxylic acid structural units derived from at least one dicarboxylic acid component selected from among: aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid, and ester-forming derivatives thereof; and aromatic dicarboxylic acids such as terephthalic acid (hereinafter also referred to as PTA), isophthalic acid, phthalic acid, 2-methylterephthalic acid, naphthalenedicarboxylic acid, biphenyldicarboxylic acid and tetralin dicarboxylic acid, and ester-forming derivatives thereof.

In one embodiment, the amorphous polyester resin (A) contains aromatic dicarboxylic acid units at a ratio of 90 to 100 mol % relative to all dicarboxylic acid units constituting the amorphous polyester resin (A).

The diol structural unit is not particularly limited, and examples thereof include diol structural units derived from at least one diol component selected from among: aliphatic diols such as ethylene glycol (hereinafter also referred to as EG), trimethylene glycol, 1,4-butanediol, 1,5-pentanediol, 1,6-hexanediol, diethylene glycol, propylene glycol and neopentylglycol; polyether compounds such as polyethylene glycol, polypropylene glycol and polybutylene glycol; alicyclic diols such as 1,3-cyclohexanedimethanol, 1,4-cyclohexanedimethanol (hereinafter also referred to as CHDM), 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclododecanedimethanol and 2,2,4,4-tetramethyl-1,3-cyclobutanediol (hereinafter also referred to as CBDO); heterocyclic diols such as cyclic acetals including 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane (hereinafter also referred to as SPG) and 1,4:3,6-dianhydro-D-sorbitol (hereinafter also referred to as ISB); bisphenols such as 4,4'-(1-methylethylidene)bisphenol, methylene bisphenol (bisphenol F), 4,4'-cyclohexylidene bisphenol (bisphenol Z) and 4,4'-sulfonylbisphenol (bisphenol S); alkylene oxide adducts of the bisphenols; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkylene oxide adducts of the aromatic dihydroxy compounds.

In particular, from the viewpoint of transparency, heat resistance and impact resistance, a unit derived from at least one of the alicyclic diol and the heterocyclic diol is preferably possessed as the diol structural unit.

Note that the alicyclic diol refers to a substance having both a cyclic aliphatic hydrocarbon moiety and a diol moiety. The cyclic aliphatic hydrocarbon means a group containing at least one non-aromatic saturated or partially unsaturated carbocyclic ring (3 to 6-membered) having 3 to 18 carbon atoms (e.g., a group containing a monocyclic, bicyclic, tricyclic, condensed cyclic or spiro polycyclic hydrocarbon ring). The carbocyclic ring may be substituted or unsubstituted.

The heterocyclic diol refers to a substance having both a heterocyclic structure moiety and a diol moiety. The heterocycle means a 3 to 12-membered non-aromatic saturated or partially unsaturated monocyclic or polycyclic ring, wherein 1 to 8 heteroatoms are contained as ring atoms and the remaining ring atoms are carbon atoms. The heterocycle may be substituted or unsubstituted. The heteroatoms are independently selected from N, O and S.

As the diol, it is preferred to select at least one selected from the group consisting of 2,2,4,4-tetramethyl-1,3-cyclobutanediol (CBDO), 1,4:3,6-dianhydro-D-sorbitol (ISB), 3,9-bis(1,1-dimethyl-2-hydroxyethyl)-2,4,8,10-tetraoxaspiro[5.5]undecane (spiroglycol) (SPG) and 1,4-cyclohexanedimethanol (CHDM). When the diol-derived units have a bulky structure of CBDO as the alicyclic diol, ISB or SPG as the heterocyclic diol or the like, heat resistance can be improved while maintaining transparency. When having the structure of CHDM, impact resistance can be improved while maintaining transparency. In one embodiment, the diol includes at least one selected from the group consisting of 2,2,4,4-tetramethyl-1,3-cyclobutanediol (CBDO) and 1,4:3,6-dianhydro-D-sorbitol (ISB).

The ratio of the units derived from the alicyclic diol and/or heterocyclic diol in all diol structural units in the amorphous polyester resin (A) is preferably 50 to 100 mol %. When the ratio of the alicyclic/heterocyclic diol structural units in all diol structural units is 50 mol % or more, heat resistance and impact resistance of the laminate can be improved. The ratio of the units derived from the alicyclic diol and/or heterocyclic diol in all diol structural units in the amorphous polyester resin (A) is more preferably 90 to 100 mol %, and even more preferably 95 to 100 mol %.

In this specification, the expression "units derived from the alicyclic diol and/or heterocyclic diol" refers to units derived from at least one of the alicyclic diol and the heterocyclic diol, and the expression "the ratio of units derived from the alicyclic diol and/or heterocyclic diol in all diol structural units" refers to the ratio of the total amount (mol %) of the alicyclic diol and the heterocyclic diol relative to all diol structural units (100 mol %).

From the viewpoint of transparency and impact resistance, the glass transition temperature of the amorphous polyester resin (A) is preferably 80° C. or higher, more preferably 95° C. or higher, even more preferably 100° C. or higher, and particularly preferably 110° C. or higher. In this specification, the glass transition temperature (Tg) is a temperature obtained by carrying out the measurement using a differential scanning calorimeter and 10 mg of a sample at a temperature raising rate of 10° C./min and calculation according to a midpoint method with second heating.

In one embodiment, the amorphous polyester resin (A) comprises units derived from the alicyclic diol and/or heterocyclic diol as diol units and has a glass transition temperature of 110 to 135° C. In this case, the thermoplastic resin laminate of the present invention is excellent in thermoformability (pressure formability, thermal bending formability) and insert moldability, and a thermoformed product excellent in shape stability under high-temperature conditions and under high-temperature and high-humidity conditions can be obtained.

Regarding the composition of the amorphous polyester resin (A) satisfying this, as the dicarboxylic acid structural unit, it is preferred to select PTA, and as the diol structural unit, it is preferred to select (i) a combination of CBDO and CHDM, (ii) a combination of ISB, EG and CHDM, (iii) a combination of SPG, EG and CHDM, (iv) a combination of EG and CHDM or the like. In particular, from the viewpoint of thermal shapability (thermoformability, thermal bending) and shape stability, the diol structural unit of the amorphous polyester resin (A) is more preferably (i) a combination of CBDO and CHDM or (ii) a combination of ISB, EG and CHDM.

When (i) CBDO and CHDM is contained as the diol structural unit, the ratio of the diol structural unit derived from CBDO in all diol structural units (100 mol %) in the amorphous polyester resin (A) is preferably 20 to 40 mol %, and the ratio of the diol structural unit derived from CHDM is preferably 60 to 80 mol %. When the ratio of the diol structural unit derived from CBDO is 20 mol % or more, shape stability under high-temperature conditions and under high-temperature and high-humidity conditions is more satisfactory. When the ratio of the diol structural unit derived from CBDO is 40 mol % or less, an amorphous polyester resin is usually obtained, whitening due to crystallization is suppressed even under high-temperature conditions, and a laminate having excellent transparency is obtained. Further, when the ratio of the diol structural unit derived from CHDM is 60 mol % or more, impact resistance can be improved. When the ratio of the diol structural unit derived from CHDM is 80 mol % or less, there is a tendency that an amorphous polyester resin is usually obtained, that whitening due to crystallization is suppressed even under high-temperature conditions, and that a laminate having excellent transparency is obtained. Moreover, the amorphous polyester resin (A) preferably contains units derived from the alicyclic diol at a ratio of 90 to 100 mol % relative to all diol units constituting the amorphous polyester resin (A).

In a preferred embodiment, the amorphous polyester resin (A) contains units derived from 2,2,4,4-tetramethyl-1,3-cyclobutanediol (CBDO) at a ratio of 25 to 40 mol % and units derived from 1,4-cyclohexanedimethanol (CHDM) at a ratio of 60 to 75 mol % relative to all diol units constituting the amorphous polyester resin (A) (100 mol %) and contains units derived from an alicyclic diol at a ratio of 90 to 100 mol % relative to all the diol units constituting the amorphous polyester resin (A). In this case, a thermoplastic resin laminate having improved thermoformability (in particular, thermal bending formability) and shape stability under high-temperature conditions and under high-temperature and high-humidity conditions is obtained.

Examples of the amorphous polyester resin (A) consisting of PTA, CBDO and CHDM satisfying the above-described conditions include "TRITAN TX2001", "TRITAN TX1001" and "TRITAN TX1501HF" (trade names, manufactured by Eastman Chemicals).

When (ii) ISB, EG and CHDM is contained as the diol structural unit, the ratio of the diol structural unit derived from ISB in all diol structural units (100 mol %) in the amorphous polyester resin (A) is preferably 5 to 30 mol %, the ratio of the diol structural unit derived from EG is preferably 25 to 45 mol %, and the ratio of the diol structural unit derived from CHDM is preferably 40 to 55 mol %. When the ratio of the diol structural unit derived from ISB is 5 mol % or more, shape stability under high-temperature conditions and under high-temperature and high-humidity conditions is satisfactory. When the ratio of the diol structural unit derived from ISB is 30 mol % or less, an amorphous polyester resin is usually obtained, whitening due to crystallization is suppressed even under high-temperature conditions, and a laminate having excellent transparency is obtained. Further, when the ratio of the diol structural unit derived from EG is 25 mol % or more, there is a tendency that an amorphous polyester resin is usually obtained, that whitening due to crystallization is suppressed even under high-temperature conditions, and that a laminate having excellent transparency is obtained. When the ratio of the diol structural unit derived from EG is 45 mol % or less, shape stability under high-temperature conditions and under high-temperature and high-humidity conditions is satisfactory. Further, when the ratio of the diol structural unit derived from CHDM is 40 mol % or more, impact resistance can be improved. When the ratio of the diol structural unit derived from CHDM is 80 mol % or less, there is a tendency that an amorphous polyester resin is usually obtained, that whitening due to crystallization is suppressed even under high-temperature conditions, and that a laminate having excellent transparency is obtained.

Examples of the amorphous polyester resin (A) consisting of PTA, ISB, EG and CHDM satisfying the above-described conditions include "ECOZEN BS400D", "ECOZEN YF401D" and "ECOZEN BS100D" (trade names, manufactured by SK Chemicals).

From the viewpoint of impact resistance and formability, the weight average molecular weight (Mw) of the amorphous polyester resin (A) is preferably 10,000 to 80,000, and more preferably 30,000 to 50,000.

The method for producing the amorphous polyester resin (A) is not particularly limited, and conventionally known methods can be applied thereto. Examples thereof include a melt polymerization method such as a transesterification method and a direct esterification method and a solution polymerization method. To the amorphous polyester resin (A), various additives generally used may be added, and examples thereof include a transesterification catalyst, an esterification catalyst, an etherification prevention agent, various stabilizers such as a thermal stabilizer and a light stabilizer and a polymerization modifier.

The ratio of the polycondensate (A) in the amorphous polyester resin (A) is preferably 90% by weight or more.

To the amorphous polyester resin (A), various additives generally used may be added, and examples thereof include an antioxidant, an anti-coloring agent, an ultraviolet absorber, a light diffusing agent, a flame retardant, a mold release agent, a lubricant, an antistatic agent and a stain pigment. The content of the additives in the amorphous polyester resin (A) is, for example, 0 to 10% by weight.

The amorphous polyester resin (A) preferably contains 10 to 100 ppm of phosphorus atoms. The concentration of phosphorus atoms in the amorphous polyester resin (phosphorus concentration) can be measured, for example, by ICP atomic emission spectrometry. When the amorphous polyester resin (A) contains the phosphorus atoms in an amount within the above-described range, the amorphous polyester resin (A) is excellent in color tone, thermal stability, formability and mechanical strength. The phosphorus atoms are preferably contained in the amorphous polyester resin (A) as a monophosphate compound and/or a monophosphite compound. The monophosphate compound and/or the monophosphite compound can be added as an additive at the time of the polymerization of an amorphous copolyester resin. Examples of the monophosphate compound include phosphates such as methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate and triphenyl phosphate. Examples of the monophosphite compound include methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite and triphenyl phosphite. Among them, trimethyl phosphate and triethyl phosphate are particularly preferred. The monophosphate compound and/or the monophosphite compound is preferably added in a manner such that phosphorus atoms are contained in an amount within the above-described range in consideration of the loss due to scattering at the time of the polymerization, in particular, the polycondensation of the amorphous polyester (polycondensate (A)). When the phosphorus atoms contained in the amorphous polyester resin (A) to be used in the present invention are derived from a compound other than the monophosphate compound and/or the monophosphite compound (for example, when derived from a diphosphate, and more specifically, when derived from 1,3-phenylenebis(dixylenylphosphate)), there is a case where sufficient forming stability cannot be obtained because, for example, foaming is caused at the time of forming and it is unpreferable. Further, when the monophosphate is added to the amorphous polyester resin (A) to be used in the present invention in a manner such that the amount of the phosphorus atoms becomes a predetermined amount and it is melt-kneaded using a single or twin screw extruder or the like, there is a case where sufficient forming stability cannot be obtained because, for example, foaming is caused at the time of forming and it is unpreferable.

The first layer may contain a thermoplastic resin other than the amorphous polyester resin (A) or a rubber-based material other than the amorphous polyester resin (A) within a range in which transparency is not impaired.

For example, the content of the thermoplastic resin other than the amorphous polyester resin (A) in the first layer is preferably 30% by weight or less, more preferably 20% by weight or less, even more preferably 15% by weight or less, and particularly preferably 10% by weight or less relative to the total weight of the first layer. The content of the thermoplastic resin other than the amorphous polyester resin (A) in the first layer is, for example, 5% by weight or less. In one embodiment, the first layer substantially does not contain the thermoplastic resin other than the amorphous polyester resin (A) (for example, 0% by weight).

For example, the content of the rubber-based material other than the amorphous polyester resin (A) in the first layer is preferably 30% by weight or less, more preferably 20% by weight or less, even more preferably 15% by weight or less, and particularly preferably 10% by weight or less relative to the total weight of the first layer. The content of the rubber-based material other than the amorphous polyester resin (A) in the first layer is, for example, 5% by weight or less. In one embodiment, the first layer substantially does not contain the rubber-based material other than the amorphous polyester resin (A) (for example, 0% by weight).

Examples of the thermoplastic resin other than the amorphous polyester resin (A) include a polycarbonate resin, a polyethylene terephthalate resin, a polyethylene naphthalate resin and a polyacrylate resin.

From the viewpoint of thermoformability, the content of the polycarbonate resin in the first layer is preferably less than 20% by weight relative to the total weight of the first layer. When the content of the polycarbonate resin is too much, forming defects such as whitening, a crack, foaming, a wrinkle, etc. are easily caused at the time of thermoforming, and it may be difficult to perform thermal shaping with high design property such as deep drawing and a sharp edge shape. The content of the polycarbonate resin in the first layer is more preferably 10% by weight or less. The content of the polycarbonate resin in the first layer is, for example, 5% by weight or less. In one embodiment, the first layer substantially does not contain the polycarbonate resin (for example, 0% by weight).

Further, from the viewpoint of dimensional change due to water absorption, for example, the content of the polyacrylate resin in the first layer is preferably less than 10% by weight, more preferably 7% by weight or less, even more preferably 5% by weight or less, and still more preferably 1% by weight or less relative to the total weight of the first layer. In one embodiment, the first layer substantially does not contain the polyacrylate resin (for example, 0% by weight).

Examples of the rubber-based material include a butadiene-acrylonitrile-styrene-based core-shell type rubber, a methyl methacrylate-butadiene-styrene-based core-shell type rubber, a methyl methacrylate-butyl acrylate-styrene-based core-shell type rubber, an octyl acrylate-butadiene-styrene-based core-shell type rubber, an alkyl acrylate-butadiene-acrylonitrile-styrene-based core-shell type rubber, a butadiene-styrene-based core-shell type rubber and a methyl methacrylate-butyl acrylate-based core-shell type rubber. When using the rubber-based material, the average particle diameter of the rubber-based material is preferably 1 μm or less, more preferably 0.8 μm or less, and even more preferably 0.7 μm or less. When the average particle diameter of the rubber-based material is 1 μm or less, the probability that light scattering occurs when light shines on the rubber-based material is low and reduction in transparency is suppressed. The absolute value difference between the refractive index of the rubber-based material and the refractive index of the amorphous polyester resin (A) is preferably 0.020 or less, more preferably 0.018 or less, and even more preferably 0.015 or less. When the absolute value difference between the refractive indexes is 0.020 or less, light scattering at the interface between the amorphous polyester resin (A) and the rubber-based material is suppressed and reduction in transparency is suppressed. By adding the rubber-based material within a range in which transparency is not impaired, impact resistance can be further imparted to the thermoplastic resin laminate of the present invention.

To the first layer, various additives generally used may be added, and examples thereof include an antioxidant, an anti-coloring agent, an ultraviolet absorber, a light diffusing agent, a flame retardant, a mold release agent, a lubricant, an antistatic agent and a stain pigment. The mixing method is not particularly limited, and it is possible to use a method of compounding the total amount of the additives, a method of dry-blending a master batch, a method of dry-blending the total amount of the additives or the like. The content of the additives in the first layer is, for example, 0 to 10% by weight.

2. Second Layer

The second layer contains a (meth)acrylic resin (B) as the main component. As the (meth)acrylic resin (B) contained in the second layer, one or more materials may be used.

Note that in this specification, "(meth)acrylic acid" means acrylic acid or methacrylic acid.

The expression "mainly composed of a (meth)acrylic resin (B)" means that, for example, the content of the (meth)acrylic resin (B) in the second layer is 70% by weight or more relative to the total weight of the second layer. The content of the (meth)acrylic resin (B) in the second layer is preferably 80% by weight or more, and more preferably 90% by weight or more. By increasing the content of the (meth)acrylic resin (B), thermoformability (pressure formability, thermal bending formability), insert moldability and surface hardness of the thermoplastic resin laminate of the present invention are improved.

The (meth)acrylic resin (B) is not particularly limited, but from the viewpoint of thermoformability (pressure formability, thermal bending formability), insert moldability, surface hardness and shape stability under high-temperature conditions and under high-temperature and high-humidity conditions of the thermoplastic resin laminate of the present invention, for example, a (meth)acrylic resin, which comprises the (meth)acrylic acid ester structural unit (a) represented by general formula (1), the aliphatic vinyl structural unit (b) represented by general formula (2), and optionally the aromatic vinyl structural unit (b') represented by formula (3), wherein the ratio of the sum of the (meth)acrylic acid ester structural unit (a), the aliphatic vinyl structural unit (b) and the aromatic vinyl structural unit (b') is 80 to 100 mol % relative to the sum (100 mol %) of all the structural units in the (meth)acrylic resin (B), and wherein the ratio of the (meth)acrylic acid ester structural unit (a) is 55 mol % to 85 mol % relative to the sum (100 mol %) of the (meth)acrylic acid ester structural unit (a), the aliphatic vinyl structural unit (b) and the aromatic vinyl structural unit (b'), can be preferably used.

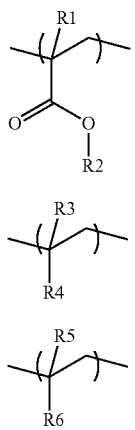

(1)

(2)

(3)

In the (meth)acrylic acid ester monomer-derived structural unit (a) (in this specification, also referred to as "(meth)acrylic acid ester structural unit (a)") represented by formula (1) constituting the (meth)acrylic resin (B), R1 represents a hydrogen atom or a methyl group, and R2 represents a $C_1$-$C_{16}$ hydrocarbon group. For example, R2 is a $C_1$-$C_{16}$ alkyl group, or a $C_5$-$C_{16}$ cycloalkyl group which is optionally substituted with a $C_1$-$C_4$ hydrocarbon group (preferably a $C_1$-$C_4$ alkyl group), preferably a $C_1$-$C_{10}$ alkyl group, and more preferably a $C_1$-$C_6$ alkyl group. When a plurality of the structural units (a) exist, R1s and R2s respectively may be the same or different from each other. Regarding the (meth)acrylic acid ester monomer, the structural unit (a) is preferably a structural unit derived from a (meth)acrylic acid ester monomer, wherein R2 is at least one selected from among a methyl group, an ethyl group, a butyl group, a lauryl group, a stearyl group, a cyclohexyl group and an isobornyl group. Specific examples thereof include (meth)acrylic acid alkyl esters such as methyl (meth)acrylate, ethyl (meth)acrylate, butyl (meth)acrylate, lauryl (meth)acrylate, stearyl (meth)acrylate, cyclohexyl (meth) acrylate and isobornyl (meth)acrylate. The structural unit (a) is more preferably a structural unit derived from at least one selected from methyl methacrylate and methyl acrylate. When the structural unit (a) of the (meth)acrylic resin (B) is a structural unit derived from at least one selected from methyl methacrylate and methyl acrylate, the (meth)acrylic resin (B) to be used for the thermoplastic resin laminate of the present invention has excellent transparency.

In the aliphatic vinyl monomer-derived structural unit (b) (in this specification, also referred to as "aliphatic vinyl structural unit (b)") represented by formula (2), R3 represents a hydrogen atom or a methyl group, and R4 is selected from among a cyclohexyl group, a cyclohexadiene group and a cyclohexene group, which are optionally substituted with a $C_1$-$C_4$ hydrocarbon group (preferably a $C_1$-$C_4$ alkyl group).

In this specification, a "hydrocarbon group" may be linear, branched or cyclic and may have a substituent.

When a plurality of the structural units (b) exist, R3s and R4s respectively may be the same or different from each other. The structural unit (b) is more preferably a structural unit, wherein R3 is a hydrogen atom or a methyl group and R4 is at least one selected from among a cyclohexyl group, a cyclohexadiene group and a cyclohexene group, and even more preferably a structural unit, wherein R3 is a hydrogen atom or a methyl group and R4 is a cyclohexyl group. When the structural unit is as described above, a laminate excellent in shape stability under high-temperature conditions and under high-temperature and high-humidity conditions is obtained.

In the aromatic vinyl monomer-derived structural unit (b') (in this specification, also referred to as "aromatic vinyl structural unit (b')") represented by formula (3), R5 represents a hydrogen atom or a methyl group, and R6 is selected from a phenyl group which is optionally substituted with a $C_1$-$C_4$ hydrocarbon group (preferably a $C_1$-$C_4$ alkyl group; e.g., a methyl group, a butyl group).

In a preferred embodiment, the (meth)acrylic resin (B) is a thermoplastic resin obtained by hydrogenation of 70% or more (preferably 80% or more, more preferably 85% or more, even more preferably 90% or more, and particularly preferably 95% or more) of aromatic double bonds in the aromatic vinyl structural unit (b') in a (meth)acrylic resin (B'), which comprises the (meth)acrylic acid ester structural unit (a) represented by formula (1) and the aromatic vinyl structural unit (b') represented by formula (3), wherein the ratio of the structural unit (a) is 55 to 85 mol % relative to the sum of the structural unit (a) and the structural unit (b'). That is, the (meth)acrylic resin (B') is a thermoplastic resin prior to hydrogenation of the (meth)acrylic resin (B).

In the (meth)acrylic resin (B), the molar ratio between the (meth)acrylic acid ester structural unit (a) represented by general formula (1) and the total of the aliphatic vinyl structural unit (b) represented by general formula (2) and the aromatic vinyl structural unit (b') represented by general formula (3) is 55:45 to 85:15, preferably 60:40 to 80:20, and more preferably 70:30 to 80:20. When the molar ratio of the (meth)acrylic acid ester structural unit (a) is 55 mol % or more relative to the sum of the (meth)acrylic acid ester structural unit (a), the aliphatic vinyl structural unit (b) and the aromatic vinyl structural unit (b'), sufficient adhesion to the amorphous polyester resin (A) layer is obtained. Further, when the molar ratio of the (meth)acrylic acid ester structural unit (a) is 85 mol % or less, a thermoplastic resin laminate obtained is excellent in shape stability under high-temperature and high-humidity conditions.

The (meth)acrylic resin (B) is obtained, for example, by hydrogenation of 70% or more of all aromatic double bonds in the aromatic vinyl structural unit (b') in the (meth)acrylic resin (B') according to the below-described method.

The (meth)acrylic resin (B) may contain a structural unit in which a part or all of aromatic double bonds of a phenyl group of R6 (a phenyl group which may have a $C_1$-$C_4$ hydrocarbon substituent) in the structural unit (b') are hydrogenated (i.e., the structural unit (b)), or may contain a structural unit in which R6 is a phenyl group (i.e., a structural unit in which aromatic double bonds of a phenyl group are not hydrogenated). Specific examples of the structural unit in which a part or all of aromatic double bonds of a phenyl group of R6 are hydrogenated (i.e., corresponding to the structural unit (b) represented by general formula (2)) include structural units derived from cyclohexane, cyclohexene, cyclohexadiene, α-methylcyclohexane, α-methylcyclohexene, α-methylcyclohexadiene, o-methylcyclohexane, o-methylcyclohexene, o-methylcyclohexadiene, p-methylcyclohexane, p-methylcyclohexene and p-methylcyclohexadiene, and at least one structural unit selected from these examples may be contained. In particular, a structural unit derived from at least one selected from cyclohexane and α-methylcyclohexane is preferably contained.

The (meth)acrylic resin (B') that is before hydrogenation of the (meth)acrylic resin (B) can be produced, for example, by polymerization of the (meth)acrylic acid ester monomer and the aromatic vinyl monomer. A publicly-known method can be used for polymerization, and for example, the production can be carried out according to a bulk polymerization method, a solution polymerization method or the like. The bulk polymerization method is carried out, for example, by a method of continuously supplying a monomer composition containing the above-described monomers and a polymerization initiator to a complete mixing tank to perform continuous polymerization at 100 to 180° C. The above-described monomer composition may contain a chain transfer agent according to need.

The polymerization initiator is not particularly limited, and examples thereof include organic peroxides such as t-amyl peroxy-2-ethylhexanoate, t-butyl peroxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexyl peroxyisopropyl monocarbonate, t-amyl peroxy-n-octoate, t-butyl peroxyisopropyl monocarbonate and di-t-butyl peroxide, and azo compounds such as 2,2'-azobisisobutyronitrile, 2,2'-azobis(2-methylbutyronitrile) and 2,2'-azobis(2,4-dimethylvaleronitrile). These substances may be used solely, or two or more of them may be used in combination.

The chain transfer agent may be used according to need, and examples thereof include α-methylstyrene dimer.

Examples of the solvent to be used in the solution polymerization method include hydrocarbon-based solvents such as toluene, xylene, cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The (meth)acrylic resin (B) to be used for the thermoplastic resin laminate of the present invention is obtained by polymerizing the (meth)acrylic acid ester monomer and the aromatic vinyl monomer to obtain the (meth)acrylic resin (B'), followed by hydrogenation of 70% or more of aromatic double bonds in the aromatic vinyl structural unit in the (meth)acrylic resin (B'). The solvent to be used in the above-described hydrogenation reaction may be the same as or different from the aforementioned polymerization solvent. Examples thereof include hydrocarbon-based solvents such as cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The method for hydrogenation is not particularly limited, and a publicly-known method can be used. For example, hydrogenation can be performed at a hydrogen pressure of 3 to 30 MPa and a reaction temperature of 60 to 250° C. by means of a batch type or continuous flow-type reaction. When the temperature is 60° C. or higher, the reaction time is not too long, and when the temperature is 250° C. or lower, cut of a molecular chain and hydrogenation of an ester moiety are rarely caused.

Examples of the catalyst to be used in hydrogenation reaction include a solid catalyst in which a metal such as nickel, palladium, platinum, cobalt, ruthenium and rhodium, or an oxide, salt or complex of the metal is carried by a porous carrier such as carbon, alumina, silica, silica-alumina and diatomaceous earth.

The (meth)acrylic resin (B) to be used for the thermoplastic resin laminate of the present invention is obtained by hydrogenation of 70% or more (preferably 80% or more, more preferably 85% or more, even more preferably 90% or more, and particularly preferably 95% or more) of aromatic double bonds in the aromatic vinyl structural unit in the (meth)acrylic resin (B'). That is, the ratio of aromatic double bonds that remain in the aromatic vinyl structural unit in the (meth)acrylic resin (B) is 30% or less. When the ratio exceeds 30%, transparency of the (meth)acrylic resin (B) is reduced, and as a result, transparency of the thermoplastic resin laminate of the present invention may be reduced. The ratio of the aromatic double bonds that remain in the aromatic vinyl structural unit is preferably 20% or less, more preferably 10% or less, even more preferably less than 10%, still more preferably 5% or less, and particularly preferably less than 5%.

In the (meth)acrylic resin (B), the molar ratio between the aliphatic vinyl structural unit (b) represented by general formula (2) and the aromatic vinyl structural unit (b') represented by general formula (3) is preferably 100:0 to 70:30, more preferably 100:0 to 80:20, even more preferably 100:0 to 90:10, and particularly preferably 100:0 to 95:5 from the viewpoint of transparency.

Further, the (meth)acrylic resin (B) may contain generally-used additives such as an antioxidant, an anti-coloring agent, an ultraviolet absorber, a light diffusing agent, a flame retardant, a mold release agent, a lubricant, an antistatic agent and a stain pigment. The content of the additives in the amorphous polyester resin (A) is, for example, 0 to 10% by weight.

The weight average molecular weight (Mw) of the (meth) acrylic resin (B) is not particularly limited, and it is preferably 100,000 to 150,000, and more preferably 110,000 to 140,000 from the viewpoint of strength and formability.

In this specification, the weight average molecular weight is a standard polystyrene equivalent weight average molecular weight measured by gel permeation chromatography (GPC).

The glass transition temperature of the (meth)acrylic resin (B) is preferably 110 to 135° C., and more preferably 120 to 130° C. When the glass transition temperature of the (meth) acrylic resin (B) is lower than 110° C., dimensional change or warpage may occur in the thermoplastic resin laminate provided by the present invention under high-temperature conditions and under high-temperature and high-humidity conditions, and it is undesirable. Further, when the glass transition temperature of the (meth)acrylic resin (B) is higher than 135° C., it is difficult to perform thermal shaping with high design property such as deep drawing and a sharp edge shape, and in addition, residual distortion at the time of forming tend to be increased and form change is easily caused by environmental change, and therefore it is undesirable.

Further, the absolute value of the difference between the glass transition temperature of the amorphous polyester resin (A) and the glass transition temperature of the vinyl copolymer resin (B) (TgB−TgA (° C.)) is preferably 10° C. or less. In this case, at least one of thermal shapability, impact resistance, surface hardness and shape stability under high-temperature conditions and under high-temperature and high-humidity conditions can be improved.

In the layer of the (meth)acrylic resin (B) to be used for the thermoplastic resin laminate of the present invention, in addition to the (meth)acrylic resin (B), another resin can be blended as long as transparency of the product is not impaired. Examples of said another resin include polystyrene, a methyl methacrylate-styrene copolymer resin, an acrylonitrile-styrene copolymer resin, poly(methyl methacrylate), polycarbonate and polyester. Specific examples (trade names) thereof include Estyrene MS200 (manufactured by Nippon Steel & Sumikin Chemical Co., Ltd.), RESISFY R-100 (manufactured by Denki Kagaku Kogyo K.K.), XIRAN SZ15170 (manufactured by Polyscope) and Toyo Styrene T080 (manufactured by TOYO STYRENE Co., Ltd.).

Further, the second layer may contain generally-used additives such as an antioxidant, an anti-coloring agent, an ultraviolet absorber, a light diffusing agent, a flame retardant, a mold release agent, a lubricant, an antistatic agent and a stain pigment. The content of the additives in the second layer is, for example, 0 to 10% by weight.

3. Thermoplastic Resin Laminate

The thermoplastic resin laminate of the present invention has the first layer mainly composed of the amorphous polyester resin (A) and the second layer mainly composed of the (meth)acrylic resin (B), wherein the second layer is placed on the first layer.

Between the first layer and the second layer, an additional layer (e.g., an adhesive layer, a primer layer, etc.) may exist. Preferably, the second layer is layered on the first layer directly.

It is sufficient when the second layer is provided on at least one side of the first layer, and the constitution of the other side is not particularly limited. The second layer may be provided on both the sides of the first layer.

As the method for producing the thermoplastic resin laminate, a publicly-known layering technique such as a multi-color injection molding method, film insert method, melt extrusion method, extrusion laminating method, hot pressing method and solution casting method can be used. Further, for such layering, an adhesive or adhesive resin suitable to be used between resins may be used.

The preparation of the thermoplastic resin laminate by means of the melt extrusion method will be described in more detail. The thermoplastic resin laminate of the present invention can be prepared by using a publicly-known melt extrusion method such as a T-die extrusion method and an inflation method. From the viewpoint of obtaining a laminate with a small uneven thickness, it is desirable to employ the T-die extrusion method. As an apparatus for melting a resin, a generally-used extruder may be used, and it may be either a single screw extruder or a multi-screw extruder. The extruder may have at least one vent, and moisture, a low-molecular-weight substance, etc. may be removed from molten resin by subjecting the vent to pressure reduction. Further, a wire mesh filter, a sintered filter, a gear pump, etc. may be provided to the end or downstream side of the extruder according to need. As a method for laminating resin, a publicly-known method such as a feed block method and a multi-manifold method can be used. Examples of T-dies include a coat hanger die, a fish-tail die and a stack plate die, and any of these examples may be selected.

The resin temperature at the time of extrusion is preferably 200 to 320° C. When the temperature is 200° C. or higher, sufficient flowability of resin is obtained, the shape of the surface of a transfer roll is transferred, and the thermoplastic resin laminate obtained has excellent smoothness. Meanwhile, when the temperature is 320° C. or lower, decomposition of resin is suppressed, and poor outer appearance, coloring, reduction in heat deformation resistance, deterioration of working environment due to odors, etc. can be prevented or suppressed. More preferably, the resin temperature at the time of extrusion is 220 to 300° C. When the temperature for extrusion is within the above-described range, the thermoplastic resin laminate obtained has excellent smoothness and transparency.

As a method for cooling a molten resin extruded from a T-die, a conventionally known method can be used. In general, cooling is performed using a cooling roll. Since the amorphous polyester resin (A) and the (meth)acrylic resin (B) to be used in the present invention are substantially amorphous resins, the temperature of the cooling roll can be set in a wide range, but when obtaining a sheet-formed product having satisfactory smoothness, in which poor outer appearance is not caused at the time of detachment from the cooling roll, the temperature of the cooling roll is preferably the glass transition temperature (Tg) of the amorphous polyester resin (A) or (meth)acrylic resin (B) (higher one) or higher and Tg+20° C. or lower, and more preferably Tg or higher and Tg+10° C. or lower. It is preferred to set the temperature of the cooling roll within the above-described range and to control the discharge rate and the taking-up speed depending on the apparatus. When the temperature of the cooling roll is within the above-described range, the thermoplastic resin laminate obtained has excellent smoothness.

The thickness of the thermoplastic resin laminate of the present invention is preferably 0.1 to 2.0 mm. When the thickness is less than 0.1 mm, the film itself is not tough and may have poor handling properties. From the viewpoint of handling properties, the thickness of the thermoplastic resin laminate is preferably 0.15 mm or more, more preferably 0.2 mm or more, and even more preferably 0.3 mm or more. Further, when the thickness is more than 2.0 mm, preheating efficiency at the time of thermoforming is low, and in addition, it may be difficult to perform thermal shaping with high design property such as deep drawing and a sharp edge shape. From the viewpoint of thermoformability, the thickness of the thermoplastic resin laminate is more preferably 1.5 mm or less, and even more preferably 1.0 mm or less. In one embodiment, the thickness of the thermoplastic resin laminate is preferably 0.15 to 2.0 mm, more preferably 0.2 to 1.5 mm, and even more preferably 0.3 to 1.0 mm. The thickness of each of the thermoplastic resin laminate and the first layer and second layer constituting the laminate can be measured according to the method described in the Examples below.

In the thermoplastic resin laminate of the present invention, the thickness of the first layer containing the amorphous polyester resin (A) is preferably 75% or more (more preferably 80% or more) of the thickness of the whole thermoplastic resin laminate, and is preferably 100 to 1900 µm. When the thickness of the first layer is 75% or more of the thickness of the whole thermoplastic resin laminate, sufficient impact resistance can be obtained. Further, when the thickness is 100 µm or more, impact resistance and weather resistance is obtained. When the thickness is 1900 µm or less, occurring of warpage under high-temperature and high-humidity conditions can be prevented or suppressed, and in addition, sufficient impact resistance is obtained. The thickness of the first layer is preferably 100 to 1500 µm, more preferably 150 to 1500 µm, even more preferably 200 to 1000 µm, and still more preferably 200 to 800 µm.

From the viewpoint of surface hardness and shape stability, for example, the thickness of the second layer is preferably 10 to 500 µm, more preferably 30 to 300 µm, even more preferably 30 to 100 µm, still more preferably 50 to 100 µm, and still even more preferably 50 to 70 µm.

Regarding the layer structure, from the viewpoint of scratch resistance and weather resistance, the second layer ((meth)acrylic resin (B) layer) is preferably placed as the outermost layer, and examples of the layer structure include a two-layer structure consisting of two types of layers such as the first layer/the second layer, and a three-layer structure consisting of two types of layers such as the second layer/the first layer/the second layer.

Any one or more of a hard coat treatment, an antireflection treatment, an antifouling treatment, an antistatic treatment, a weather resistance treatment and an anti-glare treatment can be performed on one surface or both surfaces of the thermoplastic resin laminate of the present invention. The methods for these treatments are not particularly limited, and publicly-known methods can be used. Examples thereof include a method of applying a thermosetting or photocurable film, a method of applying a reflection-reducing paint, a method of depositing a dielectric thin film and a method of applying an antistatic paint. A publicly-known coating agent can be used, and examples thereof include organic coating agents such as melamine resin, urethane resin, acrylic resin and UV curable acrylic resin, silicon-based coating agents such as a silane compound, inorganic coating agents such as a metal oxide, and organic-inorganic hybrid coating agents.

The thermoplastic resin laminate of the present invention is excellent in thermoformability (pressure formability, thermal bending formability) and insert moldability. In a preferred embodiment, the thermoplastic resin laminate has a characteristic that it is excellent in at least one of impact resistance, surface hardness and shape stability under high-temperature conditions and under high-temperature and high-humidity conditions and is suitably used for optical applications of transparent substrate materials and protective materials, etc. According to one embodiment, a decorative film comprising the thermoplastic resin laminate of the above-described embodiment is provided. According to one embodiment, a display front plate comprising the thermoplastic resin laminate of the above-described embodiment is provided.

According to another embodiment, a thermoformed body obtained by thermoforming the thermoplastic resin laminate of the above-described embodiment is provided. According to yet another embodiment, a formed body obtained by insert-molding the thermoplastic resin laminate of the above-described embodiment is provided. The formed body of the embodiment can be used for component parts of display surfaces of personal computers, mobile phones and the like, exterior and interior members of automobiles, cases and front plates having a curved surface in mobile phone terminals, personal computers, tablet PCs, car navigation systems and the like, etc. For example, the formed body according to one embodiment is a part/member to be used for applications of automobiles, electrical and electronic equipments, home appliances or aircrafts.

According to another embodiment, a method for producing a formed body, which includes thermoforming (e.g., pressure forming or thermal bending forming) or insert-molding the thermoplastic resin laminate of the above-described embodiment under an environment at 90 to 200° C. (preferably 100 to 180° C.), is provided. According to yet another embodiment, a forming method, which includes thermoforming (e.g., pressure forming or thermal bending forming) or insert-molding the thermoplastic resin laminate of the above-described embodiment under an environment at 90 to 200° C. (preferably 100 to 180° C.), is provided. One embodiment is a method for producing a formed body or forming method, which includes thermally bending the thermoplastic resin laminate of the above-described embodiment under an environment at 100 to 120° C.

According to one embodiment, a forming method or method for producing a formed body, which includes vacuum pressure forming the thermoplastic resin laminate of the above-described embodiment at a temperature of (the glass transition temperature of the amorphous polyester resin (A) or (meth)acrylic resin (B) (higher one+10° C.) or higher and (the glass transition temperature of the amorphous polyester resin (A) or (meth)acrylic resin (B) (higher one+50° C.) or lower, using a mold having a drawing ratio of 1.0 to 5.0 and a curvature radius R of a corner of 1 to 30 mm, is provided.

According to one embodiment, a forming method or method for producing a formed body, which includes thermally bending and forming the thermoplastic resin laminate of the above-described embodiment at a temperature of (the glass transition temperature of the amorphous polyester resin (A) or (meth)acrylic resin (B) (lower one)−20° C.) or higher and (the glass transition temperature of the amorphous polyester resin (A) or (meth)acrylic resin (B) (lower one)−0° C.) or lower, using a mold having a curvature radius R of 1 to 30 mm, is provided.

EXAMPLES

Hereinafter, the present invention will be described in detail by way of the Examples, but the present invention is not limited by the Examples and Comparative Examples. In this specification, "%" means "% by weight" unless otherwise specified.

The copolymers and thermoplastic resin laminates in the Examples and Comparative Examples were evaluated as described below.
<Hydrogenation Ratio of Copolymer>

Regarding the vinyl copolymer resins obtained in Synthesis Examples described below, the hydrogenation ratio was obtained based on the decrease ratio of absorption at 260 nm in the UV spectrum measurement before and after hydrogenation reaction. Using the absorbance (A1) in the case of the concentration (C1) of resin before hydrogenation reaction and the absorbance (A2) in the case of the concentration (C2) of resin after hydrogenation reaction, calculation was carried out according to the below-described formula. Note that the concentration of resin refers to a concentration of a resin in a solution to be used in the measurement of the absorbance.

$$\text{Hydrogenation ratio (\%)} = [1 - (A2 \times C1)/(A1 \times C2)] \times 100$$

<Measurement of Thickness>

The thermoplastic resin laminates and single layer bodies obtained in the Examples and Comparative Examples described below were measured using a digital micrometer (manufactured by Sony Magnescale Co., Ltd., M-30). The average of 10 measurement points of the obtained thermoplastic resin laminate was regarded as the thickness of the thermoplastic resin laminate or single layer body.
<Evaluation of Thermal Shapability>
1. Thermoformability Regarding the thermoplastic resin laminates (total thickness: 300 μm) and single layer bodies (thickness: 300 μm) obtained in the Examples and Comparative Examples described below, formability was evaluated using a grip type high-performance hot plate heating type pressure thermoforming machine manufactured by Asano Laboratories Co., Ltd. and 2 molds with different drawing ratios and corner R shapes (condition 1: drawing ratio of 1.8, corner R shape (curvature radius R of corner portion) of 10 mm, condition 2: drawing ratio of 3.2, corner R shape (curvature radius R of corner portion) of 3 mm). It was confirmed whether or not thermal shaping can be performed within a temperature range (at 5° C. intervals) that is equal to or higher than the glass transition temperature of the resin layer (A) or resin layer (B) (higher one), and with respect to a thermoformed product obtained at the highest temperature within the temperature range in which it was confirmed that thermal shaping can be performed, the shaping rate was calculated and the outer appearance thereof was observed. The shaping rate was calculated based on the volume of the mold calculated from the mold dimension and the volume of the formed product obtained by thermal shaping (measured by water filling) according to: shaping rate (%)=volume of formed product obtained by thermal shaping/volume of mold×100. The closer to 100% the shaping rate is, the better the result is. Based on the results of the shaping rate and observation of outer appearance, the thermoformability was evaluated according to the below-described criteria. The results are shown in Table 1.

Good (⊚): the shaping rate was 98.0% or more, and according to visual observation, poor outer appearance due to whitening, uneven thickness or a wrinkle was not caused.

Passed (○): the shaping rate was 98.0% or more, and according to visual observation, poor outer appearance due to whitening, uneven thickness or a wrinkle was not caused, but when the formed product obtained by thermal shaping was taken out from the mold, sticking to the mold was observed.

Poor (x): the shaping rate was less than 98.0% and/or poor outer appearance due to whitening, uneven thickness or a wrinkle was caused.

2. Thermal Bendability

Each of the thermoplastic resin laminates (total thickness: 800 μm) and single layer bodies (thickness: 800 μm) obtained in the Examples and Comparative Examples described below was cut to provide a strip-like sheet (25 mm×150 mm). It was preheated to a temperature 5° C. lower than the glass transition temperature of the resin (A) or resin (B) (lower one) using an infrared heater and subjected to hot pressing at a pressure of 5 MPa for 5 minutes to carry out forming by thermal bending using a mold for two-dimensional bending of 90° (curvature radius R=3 mm). Calculation was made according to: shaping rate of two-dimensional bending of formed product obtained by thermal bending (%)=angle of thermal bending (measurement value)/shape of mold for two-dimensional bending (90°)×100. The closer to 100% the shaping rate of two-dimensional bending is, the better the result is. The case where the shaping rate of two-dimensional bending was 80% or more was evaluated as "good: ○", and the case where it was less than 80% was evaluated as "poor: x".

<Evaluation of Mechanical Properties>
1. Evaluation of Impact Resistance

Each of the thermoplastic resin laminates (total thickness: 300 μm) and single layer bodies (thickness: 300 μm) obtained in the Examples and Comparative Examples described below was evaluated by a falling ball test, in which the (meth)acrylic resin (B) layer was the upper side and the amorphous polyester resin (A) layer was the lower side. In the falling ball test, a sample was fixed in a flange ((p 50), a metal ball ((p 20 mm, 32.6 g) was dropped, and the height at which the test piece attached to the bottom portion was broken was measured (50 mm intervals). The case where the height at the time of breaking was 300 mm or more was evaluated as "good (○)".

2. Evaluation of Surface Hardness

Regarding the thermoplastic resin laminates (total thickness: 300 μm) and single layer bodies (thickness: 300 μm) obtained in the Examples and Comparative Examples described below, in accordance with JIS K 5600-5-4:1999, the pencil hardness of the (meth)acrylic resin (B) layer was measured using pencils with different hardnesses (Uni manufactured by Mitsubishi Pencil Co., Ltd.). The case where the pencil hardness was 3H or harder was evaluated as "good (○)".

3. Evaluation of Shape Stability

Regarding each of the thermoplastic resin laminates (total thickness: 300 μm) and single layer bodies (thickness: 300 μm) obtained in the Examples and Comparative Examples described below, the thermally-shaped product obtained in the evaluation of thermal shapability (condition 1) was allowed to stand in a constant temperature and humidity machine with its temperature and humidity being set at 85° C. and 85%, respectively, for 5 days. Based on the change in the volume of the formed product obtained by thermal shaping before and after the test (measured by water filling), calculation was made according to: volumetric shrinkage ratio (%)=volume of formed product obtained by thermal shaping after test/volume of formed product obtained by thermal shaping before test×100. The smaller the volumetric shrinkage ratio is, the better the result is. The evaluation was made based on the below-described criteria.

Good (⊚): the volumetric shrinkage ratio (%) was 1.0% or less.

Passed (○): the volumetric shrinkage ratio (%) was more than 1.0% but 1.5% or less.

Poor (x): the volumetric shrinkage ratio (%) was more than 1.5%.

Synthesis Example 1 [Production of (Meth)Acrylic Resin (B1)]

A monomer composition consisting of 77.0 mol % of purified methyl methacrylate (manufactured by Mitsubishi Gas Chemical Company, Inc.), 23.0 mol % of purified styrene (manufactured by Wako Pure Chemical Industries, Ltd.) and 0.002 mol % of t-amyl peroxy-2-ethylhexanoate (manufactured by Arkema Yoshitomi, Ltd., trade name: Luperox 575) as a polymerization initiator was continuously fed to a 10-L complete mixing bath equipped with a helical ribbon impeller at a feed rate of 1 kg/h, and the monomer composition was continuously polymerized at a polymerization temperature of 150° C. for an average retention time of 2.5 hours. The reaction mixture was continuously removed through the bottom of the polymerization bath so that the liquid surface in the bath became constant, and it was introduced into a solvent-removing apparatus, thereby obtaining a (meth)acrylic resin (B1') in a pellet form.

The obtained (meth)acrylic resin (B1') was dissolved in methyl isobutyrate (manufactured by Kanto Chemical Co., Inc.), thereby preparing a 10 wt % solution of methyl isobutyrate. To a 1000-mL autoclave, 500 parts by weight of the 10 wt % solution of methyl isobutyrate containing the (meth)acrylic resin (B1') and 1 part by weight of 10 wt % palladium/carbon (Pd/C) (manufactured by N.E. Chemcat Corporation) were fed, and the mixture was maintained under a hydrogen pressure of 9 MPa at 200° C. for 15 hours, thereby hydrogenating a benzene ring moiety. The catalyst was removed using a filter, and the filtrate was introduced into a solvent-removing apparatus, thereby obtaining a (meth)acrylic resin (B1) in a pellet form. According to the $^1$H-NMR measurement, the ratio of the methyl methacrylate (MMA) structural unit in the (meth)acrylic resin (B1) was 75 mol %, and according to the measurement of absorbance at a wavelength of 260 nm, the hydrogenation rate of the benzene ring moiety of the (meth)acrylic resin (B1) was 99%. The glass transition temperature (Tg) of the obtained (meth)acrylic resin (B1) was 120° C.

Synthesis Example 2 [Production of (Meth)Acrylic Resin (B2)]

A (meth)acrylic resin (B2) was obtained in a manner similar to that in Synthesis Example 1, except that the amount of the methyl methacrylate used in Synthesis Example 1 was changed to 62.0 mol % and the amount of the styrene was changed to 38.0 mol %. According to the $^1$H-NMR measurement, the ratio of the methyl methacrylate structural unit in the (meth)acrylic resin (B2) was 60 mol %, and according to the measurement of absorbance at a wavelength of 260 nm, the hydrogenation rate of the benzene ring moiety of the (meth)acrylic resin (B2) was 99%. The glass transition temperature (Tg) of the obtained (meth) acrylic resin (B2) was 120° C.

Production Example 1 [Production of Amorphous Polyester Resin Composition (A3)]

"TRITAN TX2001" (trade name, manufactured by Eastman Chemicals, glass transition temperature (Tg): 117° C., dicarboxylic acid component PTA=100 (mol %)/diol components CBDO:CHDM=35:65 (mol %), phosphorus concentration: 17 ppm) as an amorphous polyester resin (A1) and a polycarbonate resin (Iupilon S-1000 manufactured by Mitsubishi Engineering-Plastics Corporation, glass transition temperature (Tg): 143° C.) as a polycarbonate resin (A4) were subjected to dry blending in a manner such that the weight ratio thereof became 90:10 to obtain a thermoplastic resin mixture. It was continuously introduced into a twin screw extruder having a screw diameter of 30 mm and extruded at a cylinder temperature of 270° C. and a discharge rate of 25 kg/hour, thereby obtaining an amorphous polyester resin composition (A3). The glass transition temperature (Tg) of the obtained amorphous polyester resin composition (A3) was 120° C.

Example 1 [Resin (B1)/Resin (A1)]

A thermoplastic resin laminate was obtained by co-extrusion molding using a multilayer extrusion apparatus having a single screw extruder with a screw diameter of 32 mm, a single screw extruder with a screw diameter of 65 mm, a feed block connected to all the extruders and a T-die connected to the feed block. Specifically, the (meth)acrylic resin (B1) obtained in Synthesis Example 1 was continuously introduced into the single screw extruder with the screw diameter of 32 mm and extruded at a cylinder temperature of 250° C. and a discharge rate of 10.0 kg/hour. Further, "TRITAN TX2001" (trade name, manufactured by Eastman Chemicals, glass transition temperature (Tg): 117° C., dicarboxylic acid component PTA=100 (mol %)/diol components CBDO:CHDM=35:65 (mol %), phosphorus concentration: 17 ppm) as an amorphous polyester resin (A1) was continuously introduced into the single screw extruder with the screw diameter of 65 mm and extruded at a cylinder temperature of 280° C. and a discharge rate of 50.0 kg/hour. The feed block connected to all the extruders had a distribution pin for two types of three layers, and the temperature thereof was set at 280° C. The (meth)acrylic resin (B1) and the amorphous polyester resin (A1) from the respective single screw extruders were introduced into the feed block in a flow state to be layered. The layered product was extruded into a sheet shape with the T-die connected to the feed block at 280° C., and it was cooled using 3 mirror surface rolls each at 110° C., 120° C. and 120° C. from the upstream side, thereby obtaining a thermoplastic resin laminate (1-1) in which the (meth)acrylic resin (B1) was layered on one surface of the amorphous polyester resin (A1). The difference between the glass transition temperature of the amorphous polyester resin (A1) (Tg: 117° C.) and the glass transition temperature of the (meth)acrylic resin (B1) (Tg: 120° C.) was 3° C. The total thickness of the obtained thermoplastic resin laminate (1-1) was 300 μm, and the thicknesses of the respective layers near the center thereof were (B1)/(A1)=50 μm/250 μm.

Further, a thermoplastic resin laminate (1-2), in which the total thickness was 800 μm and the thicknesses of the respective layers near the center thereof were (B1)/(A1)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (1-1) (total thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "good" (◉).

Example 2 [Resin (B2)/resin (A1)]

A thermoplastic resin laminate (2-1) in which the (meth) acrylic resin (B2) was layered on one surface of the amorphous polyester resin (A1) was obtained in a manner similar to that in Example 1, except that the (meth)acrylic resin (B2) obtained in Synthesis Example 2 was introduced instead of the (meth)acrylic resin (B1) used in Example 1. The difference between the glass transition temperature of the amorphous polyester resin (A1) (Tg: 117° C.) and the glass transition temperature of the (meth)acrylic resin (B2) (Tg: 120° C.) was 3° C. The total thickness of the obtained thermoplastic resin laminate (2-1) was 300 μm, and the thicknesses of the respective layers near the center thereof were (B2)/(A1)=50 μm/250 μm.

Further, a thermoplastic resin laminate (2-2), in which the total thickness was 800 μm and the thicknesses of the respective layers near the center thereof were (B2)/(A1)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (2-2) (total thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "good" (◉).

Example 3 [Resin (B1)/resin (A2)]

A thermoplastic resin laminate (3-1) in which the (meth) acrylic resin (B2) was layered on one surface of an amorphous polyester resin (A2) was obtained in a manner similar to that in Example 1, except that "TRITAN TX1001" (trade name, manufactured by Eastman Chemicals, glass transition temperature (Tg): 110° C., dicarboxylic acid component PTA=100 (mol %)/diol components CBDO:CHDM=23:77 (mol %), phosphorus concentration: 15 ppm) as the amorphous polyester resin (A2) was introduced instead of the amorphous polyester resin (A1) used in Example 1. The difference between the glass transition temperature of the amorphous polyester resin (A2) (Tg: 110° C.) and the glass transition temperature of the (meth)acrylic resin (B2) (Tg: 120° C.) was 10° C. The total thickness of the obtained thermoplastic resin laminate (3-1) was 300 μm, and the thicknesses of the respective layers near the center thereof were (B1)/(A2)=50 μm/250 μm.

Further, a thermoplastic resin laminate (3-2), in which the total thickness was 800 μm and the thicknesses of the respective layers near the center thereof were (B1)/(A2)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (3-1) (total thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "good" (⊚).

Example 4 [Resin (B1)/resin (A3)]

A thermoplastic resin laminate (4-1) in which the (meth)acrylic resin (B1) was layered on one surface of the amorphous polyester resin composition (A3) was obtained in a manner similar to that in Example 1, except that the amorphous polyester resin composition (A3) obtained in Production Example 1 was introduced instead of the thermoplastic resin composition (A1) used in Example 1. The difference between the glass transition temperature of the amorphous polyester resin composition (A3) (Tg: 120° C.) and the glass transition temperature of the (meth)acrylic resin (B1) (Tg: 120° C.) was 0° C. The total thickness of the obtained thermoplastic resin laminate (4-1) was 300 μm, and the thicknesses of the respective layers near the center thereof were (B1)/(A3)=50 μm/250 μm.

Further, a thermoplastic resin laminate (4-2), in which the total thickness was 800 μm and the thicknesses of the respective layers near the center thereof were (B1)/(A3)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (4-1) (total thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "good" (⊚).

Example 5 [Resin (B1)/resin (A5)]

A thermoplastic resin laminate (5-1) in which the (meth)acrylic resin (B1) was layered on one surface of an amorphous polyester resin (A5) was obtained in a manner similar to that in Example 1, except that "Easter 5011" (trade name, manufactured by Eastman Chemicals, glass transition temperature (Tg): 80° C., dicarboxylic acid component PTA=100 (mol %)/diol components EG:CHDM=65:35 (mol %), phosphorus concentration: 36 ppm) as the amorphous polyester resin (A5) was introduced instead of the amorphous polyester resin (A1) used in Example 1. The difference between the glass transition temperature of the amorphous polyester resin (A5) (Tg: 80° C.) and the glass transition temperature of the (meth)acrylic resin (B1) (Tg: 120° C.) was 40° C. The total thickness of the obtained thermoplastic resin laminate (5-1) was 300 μm, and the thicknesses of the respective layers near the center thereof were (B1)/(A5)=50 μm/250 μm.

Further, a thermoplastic resin laminate (5-2), in which the total thickness was 800 μm and the thicknesses of the respective layers near the center thereof were (B1)/(A5)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (5-1) (total thickness: 300 μm) was thermally shaped successfully at a thermoforming temperature of 135 to 165° C. Therefore, a thermoformed product obtained at a thermoforming temperature of 165° C. was used for evaluating thermoformability and shape stability. The comprehensive evaluation was "passed" (o).

Comparative Example 1 [Resin (B1)/Polycarbonate Resin (A4)]

A thermoplastic resin laminate (C2-1) in which the (meth)acrylic resin (B1) was layered on one surface of a polycarbonate resin was obtained in a manner similar to that in Example 1, except that the polycarbonate resin ("Iupilon S-1000" manufactured by Mitsubishi Engineering-Plastics Corporation, glass transition temperature (Tg): 143° C.) as a resin (A4) was used instead of the amorphous polyester resin (A1) used in Example 1. The difference between the glass transition temperature of the polycarbonate resin (A4) (Tg: 143° C.) and the glass transition temperature of the (meth)acrylic resin (B1) (Tg: 120° C.) was 23° C. The total thickness of the obtained thermoplastic resin laminate (C1-1) was 300 μm, and the thicknesses of the respective layers near the center thereof were (B1)/(A4)=50 μm/250 μm.

Further, a thermoplastic resin laminate (C1-2), in which the total thickness was 800 μm and the thicknesses of the respective layers near the center thereof were (B1)/(A4)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (C1-1) (total thickness: 300 μm) was thermally shaped successfully at a thermoforming temperature of 170 to 185° C. Therefore, a thermoformed product obtained at a thermoforming temperature of 185° C. was used for evaluating thermoformability and shape stability. The comprehensive evaluation was "poor" (x).

Comparative Example 2 [Resin (B3)/Polycarbonate Resin (A4)]

A thermoplastic resin laminate (C2-1) in which a poly(methyl methacrylate) resin (B3) was layered on one surface of the polycarbonate resin was obtained in a manner similar to that in Comparative Example 1, except that a poly(methyl methacrylate) resin ("ACRYPET VH000" manufactured by Mitsubishi Chemical Corporation, glass transition temperature (Tg): 108° C.) as the resin (B3) was used instead of the (meth)acrylic resin (B1) used in Comparative Example 1. The difference between the glass transition temperature of the polycarbonate resin (Tg: 143° C.) and the glass transition temperature of the poly(methyl methacrylate) resin (B3) (Tg: 108° C.) was 35° C. The total thickness of the obtained thermoplastic resin laminate (C2-1) was 300 μm, and the thicknesses of the respective layers near the center thereof were (B3)/(A4)=50 μm/250 μm.

Further, a thermoplastic resin laminate (C2-2), in which the total thickness was 800 μm and the thicknesses of the respective layers near the center thereof were (B3)/(A4)=50 μm/750 μm, was obtained in a manner similar to that described above, except that the discharge rate of the single screw extruder with the screw diameter of 65 mm was changed to 150.0 kg/h.

According to the evaluation of thermal shapability (condition 1), the obtained thermoplastic resin laminate (C2-1) (total thickness: 300 μm) was thermally shaped successfully at a thermoforming temperature of 170 to 185° C. Therefore, a thermoformed product obtained at a thermoforming temperature of 185° C. was used for evaluating thermoformability and shape stability. The comprehensive evaluation was "poor" (x).

Comparative Example 3 [Resin (A1)]

A single layer extrusion apparatus having a single screw extruder with a screw diameter of 65 mm and a T-die connected to the extruder was used. "TRITAN TX2001" (trade name, manufactured by Eastman Chemicals, glass transition temperature (Tg): 117° C., dicarboxylic acid component PTA=100 (mol %)/diol components CBDO:CHDM=35:65 (mol %), phosphorus concentration: 17 ppm) as an amorphous polyester resin (A1) was continuously introduced into the single screw extruder and extruded at a cylinder temperature of 280° C. and a discharge rate of 30.0 kg/h. It was extruded into a sheet shape with the T-die connected thereto at 280° C. and cooled using 3 mirror surface rolls each at 115° C., 115° C. and 117° C. from the upstream side, thereby obtaining a single layer body of the amorphous polyester resin (A1) (C3-1). The thickness of the obtained single layer body (C3-1) was 300 μm.

Further, a single layer body of the amorphous polyester resin (A1) (C3-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the amorphous polyester resin (A1) (C3-1) (thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "poor" (x).

Comparative Example 4 [Resin (A2)]

A single layer body of an amorphous polyester resin (A2) (C4-1) was obtained in a manner similar to that in Comparative Example 3, except that "TRITAN TX1001" (trade name, manufactured by Eastman Chemicals, glass transition temperature (Tg): 110° C., dicarboxylic acid component PTA=100 (mol %)/diol components CBDO:CHDM=23:77 (mol %), phosphorus concentration: 15 ppm) was used as the amorphous polyester resin (A2) as the resin (A2) instead of the amorphous polyester resin (A1) used in Comparative Example 3. The thickness of the obtained single layer body of the amorphous polyester resin (A2) (C4-1) was 300 μm.

Further, a single layer body of the amorphous polyester resin (A2) (C4-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the amorphous polyester resin (A2) (C4-1) (thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "poor" (x).

Comparative Example 5 [Resin (A4)]

A single layer body of a polycarbonate resin (A4) (C5-1) was obtained in a manner similar to that in Comparative Example 3, except that a polycarbonate resin ("Iupilon S-1000" manufactured by Mitsubishi Engineering-Plastics Corporation, glass transition temperature (Tg): 143° C.) was used as the resin (A4) instead of the amorphous polyester resin (A1) used in Comparative Example 3. The thickness of the obtained single layer body of the polycarbonate resin (A4) (C5-1) was 300 μm.

Further, a single layer body of the polycarbonate resin (A4) (C5-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the polycarbonate resin (A4) (C5-1) (thickness: 300 μm) was thermally shaped successfully at a thermoforming temperature of 170 to 185° C. Therefore, a thermoformed product obtained at a thermoforming temperature of 185° C. was used for evaluating thermoformability and shape stability. The comprehensive evaluation was "poor" (x).

Comparative Example 6 [Resin (B1)]

A single layer body of a (meth)acrylic resin (B1) (C6-1) was obtained in a manner similar to that in Comparative Example 3, except that the (meth)acrylic resin (B1) obtained in Synthesis Example 1 was used instead of the amorphous polyester resin (A1) used in Comparative Example 3. The thickness of the obtained single layer body of the (meth)acrylic resin (B1) (C6-1) was 300 μm.

Further, a single layer body of the (meth)acrylic resin (B1) (C6-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the (meth)acrylic resin (B1) (C6-1) (thickness: 300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "poor" (x).

Comparative Example 7 [Resin (B2)]

A single layer body of a (meth)acrylic resin (B2) (C7-1) was obtained in a manner similar to that in Comparative Example 3, except that the (meth)acrylic resin (B2) obtained in Synthesis Example 2 was used instead of the amorphous polyester resin (A1) used in Comparative Example 3. The thickness of the obtained single layer body of the (meth)acrylic resin (B2) (C7-1) was 300 μm.

Further, a single layer body of the (meth)acrylic resin (B2) (C7-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the (meth)acrylic resin (B2) (C7-1) (300 μm) was thermally shaped successfully at a thermoforming temperature of 145 to 170° C. Therefore, a thermoformed product obtained at a thermoforming temperature of 170° C. was used for evaluating thermoformability and shape stability. The comprehensive evaluation was "poor" (x).

Comparative Example 8 [Resin (B3)]

A single layer body of a poly(methyl methacrylate) resin (B3) (C8-1) was obtained in a manner similar to that in Comparative Example 3, except that the poly(methyl methacrylate) resin (B3) ("ACRYPET VH000" manufactured by Mitsubishi Chemical Corporation, glass transition temperature (Tg): 108° C.) was used instead of the amorphous polyester resin (A1) used in Comparative Example 3. The thickness of the obtained single layer body of the poly(methyl methacrylate) resin (B3) (C8-1) was 300 μm.

Further, a single layer body of the poly(methyl methacrylate) resin (B3) (C8-2) having a thickness of 800 μm was obtained in a manner similar to that described above, except that the discharge rate of the single screw extruder with the screw diameter of 65 mm was changed to 80.0 kg/h.

According to the evaluation of thermal shapability (condition 1), the obtained single layer body of the poly(methyl methacrylate) resin (B3) (C8-1) (thickness: 300 μm) was thermally shaped successfully at a thermoforming temperature of 135 to 160° C. Therefore, a thermoformed product obtained at a thermoforming temperature of 160° C. was used for evaluating thermoformability and shape stability. The comprehensive evaluation was "poor" (x).

<Evaluation of Formed Body>

Regarding the thermoplastic resin laminates and the single layer bodies produced in the Examples and Comparative Examples, the evaluation results of thermal shapability, mechanical properties and shape stability are shown in Table 1 below.

TABLE 1

| | Constitution | | Thermal shapability | | | Mechanical properties | | Shape stability | |
|---|---|---|---|---|---|---|---|---|---|
| | First layer | Second layer | Conditions 1 | Conditions 2 | Thermal bending | Impact resistance | Surface hardness | 85° C. 85% RH | Comprehensive evaluation |
| Example 1 | (A1) | (B1) | ◎ Good | ◎ Good | ○ 90% | ○ 300 mm or more | ○ 3H | ◎ 0.4% | ◎ |
| Example 2 | (A1) | (B2) | ◎ Good | ◎ Good | ○ 90% | ○ 300 mm | ○ 3H | ◎ 0.4% | ◎ |
| Example 3 | (A2) | (B1) | ◎ Good | ◎ Good | ○ 80% | ○ 300 mm or more | ○ 3H | ◎ 0.6% | ◎ |
| Example 4 | (A3) | (B1) | ◎ Good | ◎ Good | ○ 92% | ○ 300 mm or more | ○ 3H | ◎ 0.4% | ◎ |
| Example 5 | (A5) | (B1) | ◎ Good | ◎ Passed | — (Unmeasured) | ○ 300 mm or more | ○ 3H | ○ 1.5% | ○ |
| Comparative Example 1 | (A4) | (B1) | ◎ Good | X Poor | X 25% | ○ 300 mm or more | ○ 3H | X 3.1% | X |
| Comparative Example 2 | (A4) | (B3) | ◎ Good | X Poor | X 25% | ○ 300 mm or more | ○ 4H | X 1.7% | X |
| Comparative Example 3 | (A1) | | ◎ Good | ◎ Good | ○ 92% | ○ 300 mm or more | X 4B | ◎ 0.4% | X |
| Comparative Example 4 | (A2) | | ◎ Good | ◎ Good | ○ 92% | ○ 300 mm or more | X 4B | ◎ 0.4% | X |
| Comparative Example 5 | (A4) | | ◎ Good | ◎ Good | ○ 88% | ○ 300 mm or more | X 3B | ◎ 0.6% | X |
| Comparative Example 6 | (B1) | | ◎ Good | ◎ Good | ○ 92% | X 100 mm | ○ 3H | ◎ 0.4% | X |
| Comparative Example 7 | (B2) | | ◎ Good | ◎ Good | ○ 92% | X 50 mm | ○ 3H | ◎ 0.4% | X |

TABLE 1-continued

| | Constitution | | Thermal shapability | | | Mechanical properties | | Shape stability | |
| --- | --- | --- | --- | --- | --- | --- | --- | --- | --- |
| | First layer | Second layer | Conditioins 1 | Conditions 2 | Thermal bending | Impact resistance | Surface hardness | 85° C. 85% RH | Comprehensive evaluation |
| Comparative Example 8 | | (B3) | ◎ Good | ◎ Good | ○ 92% | X 100 mm | ○ 4H | X 4.0% | X |

A1: amorphous polyester resin "TRITAN TX2001" manufactured by Eastman Chemicals (Tg: 117° C., dicarboxylic acid component PTA = 100 (mol %)/diol components CBDO:CHDM = 35:65 (mol %), Mw: 40,500, phosphorus concentration: 17 ppm)
A2: amorphous polyester resin "TRITAN TX1001" manufactured by Eastman Chemicals (Tg: 110° C., dicarboxylic acid component PTA = 100 (mol %)/diol components CBDO:CHDM = 23:77 (mol %), Mw: 74,600, phosphorus concentration: 15 ppm)
A3: mixture of amorphous polyester resin (A1) and polycarbonate resin (A4) (weight ratio 90:10) (Tg: 120° C.)
A4: polycarbonate resin "Iupilon S-1000" manufactured by Mitsubishi Engineering-Plastics Corporation (Tg: 143° C., Mw: 45,800)
A5: amorphous polyester resin "Easter 5011" manufactured by Eastman Chemicals (Tg: 80° C., dicarboxylic acid component PTA = 100 (mol %)/diol components EG:CHDM = 65:35 (mol %), Mw: 40,600, phosphorus concentration: 36 ppm)
B1: (meth)acrylic resin (Tg: 120° C.) (hydrogenated resin of MMA-styrene copolymer, hydrogenation rate: 99%, MMA: 75 mol %, Mw: 125,000)
B2: (meth)acrylic resin (Tg: 120° C.) (hydrogenated resin of MMA-styrene copolymer, hydrogenation rate: 99%, MMA: 60 mol %, Mw: 132,000)
B3: poly(methyl methacrylate) resin "ACRYPET VH000" manufactured by Mitsubishi Chemical Corporation (Tg: 108° C., Mw: 140,000)

It is confirmed from Table 1 that the thermoplastic resin laminate in the Examples, in which the second layer mainly composed of the (meth)acrylic resin (B) is placed on the first layer mainly composed of the amorphous polyester resin (A) of the present invention, is excellent in thermoformability and is also excellent in mechanical properties and shape stability. In particular, it is understood that the laminate of the present invention is excellent in thermal shapability and poor outer appearance due to whitening, uneven thickness, a wrinkle or the like is prevented even under condition 2 in which a mold with deep drawing and a sharp edge shape is used.

In particular, when using the amorphous polyester resin (A1) or (A2) containing CBDO that is an alicyclic diol at a specific ratio as the amorphous polyester resin (A) (Examples 1-4), thermoformability was satisfactory even in the case of using the mold with deep drawing and a sharp edge shape (condition 2), and in addition, shape stability was also excellent.

Meanwhile, in the case of the laminate of the polycarbonate resin and the (meth)acrylic resin (B) (Comparative Examples 1-2), forming defects were caused under condition 2 in which the mold with deep drawing and a sharp edge shape was used.

Further, regarding the single layer body of the amorphous polyester resin (A) (Comparative Examples 3-4), the single layer body of the polycarbonate resin (Comparative Example 5) and the single layer body of the (meth)acrylic resin (B) (Comparative Examples 6-8), it was confirmed that thermal shapability is excellent, but at least one of impact resistance, surface hardness and shape stability is poor.

Note that all the documents and publications cited herein are incorporated herein by reference in their entireties regardless of purposes thereof. In addition, the contents disclosed in the claims, specification and drawings of Japanese Patent Application No. 2018-202085 (filed on Oct. 26, 2018), to which priority is claimed by the present application, are incorporated herein.

The several embodiments of the present invention were described above, but these embodiments were presented as examples and it is not intended to limit the scope of the invention thereby. These novel embodiments can be practiced in other various modes and can be omitted, substituted or modified variously without departing from the gist of the present invention. These embodiments and modifications thereof are included in the scope or gist of the invention and also included in the scope of the inventions recited in the claims and equivalents thereof.

The invention claimed is:

1. A thermoplastic resin laminate, which comprises a first layer mainly composed of an amorphous polyester resin (A) and a second layer mainly composed of a (meth)acrylic resin (B), the second layer being placed on the first layer; wherein
the content of the amorphous polyester resin (A) in the first layer is 80% by weight or more relative to the total weight of the first layer;
the content of the (meth)acrylic resin (B) in the second layer is 70% by weight or more relative to the total weight of the second layer;
the amorphous polyester resin (A) has a glass transition temperature of 110 to 135° C. and a weight average molecular weight of 30,000 to 50,000 and comprises a unit derived from 2,2,4,4-tetramethyl-1,3-cyclobutanediol (CBDO) at a ratio of 25 to 40 mol % and a unit derived from 1,4-cyclohexanedimethanol (CHDM) at a ratio of 60 to 75 mol % relative to all diol units constituting the amorphous polyester resin (A) (100 mol %),
the (meth)acrylic resin (B) has a glass transition temperature of 110 to 135° C. and a weight average molecular weight of 100,000 to 150,000;
the absolute value of the difference between the glass transition temperature of the amorphous polyester resin (A) and the glass transition temperature of the (meth)acrylic resin (B) is 10° C. or less;
the (meth)acrylic resin (B) comprises:
a (meth)acrylic acid ester structural unit (a) represented by formula (1) below:

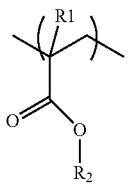

(1)

where R1 represents a hydrogen atom or a methyl group, and R2 represents a $C_1$-$C_{16}$ hydrocarbon group,
an aliphatic vinyl structural unit (b) represented by formula (2) below:

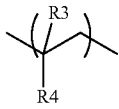

(2)

where R3 represents a hydrogen atom or a methyl group, and R4 is selected from among a cyclohexyl group, a cyclohexadiene group and a cyclohexene group, which are optionally substituted with a $C_1$-$C_4$ hydrocarbon group, and optionally an aromatic vinyl structural unit (b') represented by formula (3) below:

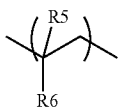
(3)

where R5 represents a hydrogen atom or a methyl group, and R6 represents a phenyl group which is optionally substituted with a $C_1$-$C_4$ hydrocarbon group;

the ratio of the sum of the (meth)acrylic acid ester structural unit (a), the aliphatic vinyl structural unit (b) and the aromatic vinyl structural unit (b') is 90 to 100 mol % relative to the sum of all the structural units in the (meth)acrylic resin (B); and the ratio of the (meth)acrylic acid ester structural unit (a) is 55 mol % to 85 mol % relative to the sum of the (meth)acrylic acid ester structural unit (a), the aliphatic vinyl structural unit (b) and the aromatic vinyl structural unit (b').

2. The thermoplastic resin laminate according to claim 1, wherein the content of a polycarbonate resin in the first layer is less than 20% by weight.

3. The thermoplastic resin laminate according to claim 1, wherein the amorphous polyester resin (A) contains units derived from an alicyclic diol at a ratio of 90 to 100 mol % relative to all the diol units constituting the amorphous polyester resin (A).

4. The thermoplastic resin laminate according to claim 1, wherein the first layer substantially does not contain a polycarbonate resin.

5. The thermoplastic resin laminate according to claim 1, wherein the amorphous polyester resin (A) contains aromatic dicarboxylic acid units at a ratio of 90 to 100 mol % relative to all dicarboxylic acid units constituting the amorphous polyester resin (A).

6. The thermoplastic resin laminate according to claim 1, which has a thickness of 0.15 to 2.0 mm.

7. A decorative film comprising the thermoplastic resin laminate according to claim 1.

8. A display front plate comprising the thermoplastic resin laminate according to claim 1.

9. A thermoformed body obtained by thermoforming the thermoplastic resin laminate according to claim 1.

10. The thermoplastic resin laminate according to claim 1, wherein the content of the amorphous polyester resin (A) in the first layer is 90% to 100% by weight relative to the total weight of the first layer.

11. The thermoplastic resin laminate according to claim 1, wherein the content of the (meth)acrylic resin (B) in the second layer is 100% by weight relative to the total weight of the second layer.

12. The thermoplastic resin laminate according to claim 1, wherein the (meth)acrylic resin (B) is a hydrogenated resin of a methyl methacrylate (MMA)-styrene copolymer, the hydrogenated resin of a methyl methacrylate (MMA)-styrene copolymer having a hydrogenation rate of 99%, an MMA content of 60-75 mol % relative to all units constituting the MMA-styrene copolymer, and a weight average molecular weight of 125,000 to 132,000.

* * * * *